United States Patent
Lichtensteiger et al.

(10) Patent No.: US 12,109,662 B2
(45) Date of Patent: Oct. 8, 2024

(54) CLAMPING DEVICE FOR A TOOL ON A MACHINE TOOL

(71) Applicant: Ivoclar Vivadent AG, Schaan (LI)

(72) Inventors: Markus Lichtensteiger, Montlingen (CH); Vadim Bogdan, Pforzheim (DE)

(73) Assignee: Ivoclar Vivadent AG, Schaan (LI)

( * ) Notice: Subject to any disclaimer, the term of this patent is extended or adjusted under 35 U.S.C. 154(b) by 922 days.

(21) Appl. No.: 17/164,257

(22) Filed: Feb. 1, 2021

(65) Prior Publication Data

US 2021/0252610 A1    Aug. 19, 2021

(30) Foreign Application Priority Data

Feb. 14, 2020 (EP) .................................. 20157403

(51) Int. Cl.
    *B23Q 3/155*    (2006.01)

(52) U.S. Cl.
    CPC ............ *B23Q 3/15526* (2013.01); *B23Q 2003/15527* (2016.11); *Y10T 279/17435* (2015.01)

(58) Field of Classification Search
    CPC ...... B23Q 3/15526; B23Q 2003/15527; B23B 2231/2021; B23B 2231/2035; B23B 2231/2091; Y10T 279/17316; Y10T 279/17435
    See application file for complete search history.

(56) References Cited

U.S. PATENT DOCUMENTS

| | | | |
|---|---|---|---|
| 1,917,752 A * | 7/1933 | Connell | B23B 31/2025 279/46.4 |
| 3,604,565 A | 9/1971 | Freeman | |
| 4,509,649 A | 4/1985 | Evans | |
| 4,858,302 A | 8/1989 | Stribiak | |
| 5,154,686 A * | 10/1992 | Klarer | B23Q 13/00 211/1.51 |
| 5,253,414 A | 10/1993 | Gaudette et al. | |
| 2011/0281503 A1 | 11/2011 | Knecht et al. | |
| 2014/0100095 A1 | 4/2014 | Shih et al. | |
| 2019/0084054 A1 * | 3/2019 | Brosowsky | B23B 31/265 |
| 2019/0388931 A1 | 12/2019 | Vogel et al. | |

FOREIGN PATENT DOCUMENTS

| | | | |
|---|---|---|---|
| CN | 207806671 U | 9/2018 | |
| DE | 4031986 C1 * | 5/1991 | |
| DE | 202015100312 U1 | 3/2015 | |
| DE | 102015106437 A1 * | 10/2016 | B23B 29/046 |

(Continued)

*Primary Examiner* — Eric A. Gates
(74) *Attorney, Agent, or Firm* — Ann M. Knab; Thad McMurray (57) ABSTRACT

The invention relates to a clamping device (10) for a tool (18) on a machine tool having a holder block (12) with at least 2, in particular a multiplicity of, apertures (16) for receiving clamping sleeves (14), wherein at least two clamping sleeves (14) are received in the apertures (16). Each clamping sleeve (12) has a clamping element (36), with which a tool (18), in particular a shaft (20) of a tool (18), can be clamped. The clamping sleeve (14) at least partially passes through in each case the aperture (16) in the holder block (12) and has, at its end opposite the clamping element (36), the rear end, an expansion element (34) which engages behind the holder block (12) or a counter-support element (30) of the holder block (12).

17 Claims, 5 Drawing Sheets

(56) References Cited

FOREIGN PATENT DOCUMENTS

| | | | |
|---|---|---|---|
| DE | 202018102658 | U1 | 5/2018 |
| JP | S62100837 | U | 6/1987 |
| JP | S62201638 | U | 12/1987 |
| JP | H02-000036 | U | 1/1990 |
| KR | 20080111204 | A * | 12/2008 |

* cited by examiner

CLAMPING DEVICE FOR A TOOL ON A MACHINE TOOL

CROSS-REFERENCE TO RELATED APPLICATIONS

This application claims priority to European patent application No. 20157403.5 filed on Feb. 14, 2020, the disclosure of which is incorporated herein by reference in its entirety.

FIELD OF THE INVENTION

The invention relates to a machine tool, a clamping sleeve and a clamping device for a tool on a machine tool.

BACKGROUND

Machine tools, such as dental milling machines, frequently require several different tools in order to meet the different requirements of the machining procedure.

For instance, in a dental milling machine it is also possible to use tools other than milling tools, e.g. drilling tools or rotary grinding tools. Moreover, it is frequently the case that different diameters and shapes of the tools are desirable, as well as different sizes.

Overall, there is e.g. a requirement to provide 12 to 30 tools.

Basically, it is also possible to carry out a tool change manually but it is desirable to perform the tool change automatically. For this purpose, it has become known to provide numerous tools of different origin in a so-called tool bank. The tool bank then has a holder block which has a multiplicity of apertures in which the tools are stored.

Then, for the purpose of changing a tool a relative movement is performed between the tool bank with the holder block on the one hand and the tool and at least one empty aperture and the clamped tool on the other hand, and the tool of the machine tool currently in use is transferred to an empty aperture in the holder block and then one of the other tools of the holder block which is to be used as the next tool is newly attached.

Typically, the tool change is likewise preferably performed automatically. For this purpose, the tools are received in the holder block but with their shafts freely accessible, i.e. protruding from the holder block. Typically, clamping sleeves are provided, into which the tools are inserted, wherein the shaft of the tool protrudes from the clamping sleeve.

Each clamping sleeve is then received in an aperture and holds the tool by frictional engagement but in such a way that the shaft of the tool is freely accessible. Since tools can have not only a different diameter and a different shape but also a different length, the clamping sleeves and also the apertures are designed as through-apertures, i.e. they extend through the holder block. The clamping sleeves also have a through-aperture and so the tools can also protrude on their working side from the clamping sleeve.

For the purpose of changing a tool, it is preferred that the tool spindle can automatically grip the shaft of the tool with its chuck and, against the frictional resistance of the clamping sleeve, can pull said shaft out of the clamping sleeve or insert said shaft into the clamping sleeve.

EP 552 922 A1 and corresponding U.S. Pat. No. 5,253,414, which is hereby incorporated by reference in its entirety, discloses a clamping device for a tool on a machine tool, in which a holder block is provided which, as a type of tool bank, can receive a multiplicity of tools. For this purpose, the holder block has a multiplicity of recesses which are provided with a type of clamping sleeve, in which the tools are held in a resilient manner in a region of slightly larger diameter.

Such tool banks having holder blocks have also become known in the case of dental machine tools, for which reason reference is to be made by way of example to DE 20 2015 100 312 U1.

The transfer of the tools to the tool bank and also the removal therefrom is not quite trivial. On the one hand, it is necessary to provide exact positions of the shafts of the tools on the holder block, e.g. with a precision of 0.1 to 0.2 mm. This is because the chuck of the machine tool must grip the shaft exactly in order to permit the required imbalance-free clamping.

This requires on the one hand fixed and on the other hand slightly flexible mounting of the tools on the holder block and so it has been proposed to use high quality metals, such as beryllium-copper, for the clamping sleeves. However, although the material is highly suitable in mechanical terms, unfortunately it is not corrosion-free; the mounting becomes less precise owing to the development of green rust.

The tool bank having the holder block and the tools, with which the apertures and clamping sleeves are optionally equipped is frequently movable, e.g. together with the workpiece arm of the machine tool. The occurring accelerations render it necessary to keep the holding force of the clamping sleeves high.

By reason of the required safety buffer, e.g. a force of 50 N can be set as an extraction force. A particular advantage of beryllium-copper is the dimensional stability and durability per se and that the spring properties of this material are stable even during frequent load changes, such as arise during frequent tool changes on the clamping sleeve.

On the basis of these advantages, it has been proposed to still work with beryllium-copper clamping sleeves and to fix them in an interchangeable or replaceable manner, e.g. by means of Seeger rings, on the holder block.

SUMMARY

In contrast thereto, the object of the invention is to provide a machine tool, clamping device for a tool on a machine tool, and a clamping sleeve to be received in a clamping device, according to the claims, which has an at least equally good level of durability, is comparatively inexpensive and permits safe operation of the machine tool.

In accordance with the invention, this object is achieved by the independent claims. Advantageous developments are apparent from the dependent claims.

In accordance with the invention, provision is made to configure the clamping sleeve in a particular manner: the clamping sleeve in accordance with the invention engages behind the holder block or a counter-support element in the aperture of the holder block and has at this location a specific expansion element which ensures the rear engagement. The expansion element is self-deflecting, i.e. elastic and expands as soon as it has passed through the counter-support element or the holder block.

It has preferably latching abutment shoulders and slots which separate tongues of the expansion element. Each tongue deflects radially outwards and in this respect is intrinsically elastic. This resilient design renders it possible to ensure durability of the clamping sleeve even in the case of high change loads.

In order to further increase the durability of the clamping sleeve, the clamping element for receiving the tool in a manner known per se has radially inwards resilient clamping elements. In a preferred embodiment of the invention, they have an inwardly pointing protrusion. This protrusion is turned radially inwards towards the tool and in the clamped state lies preferably against a holder ring of the tool.

The holder ring is pressed or shrink-fitted onto the tool in a manner known per se and consists typically of brass if the tool consists of steel. The protrusion is seated externally on the holder ring and fixes it together with the narrow guide of the tool internally in the clamping sleeve at the desired location.

It is readily possible to remove the tool from the clamping sleeve, by overcoming the frictional force of the protrusion on the holder ring of the tool.

In accordance with the invention, it is particularly favourable that an expansion element is formed on the rear end of the clamping sleeve. The end of the clamping sleeve, at which the expansion element is formed is defined as the rear end and the end, at which the tool-receiving clamping element is arranged is defined as the front end.

The expansion element in accordance with the invention has outwardly facing abutment shoulders. They engage behind at least a part of the tool block. This part can be the rear end of the aperture or e.g. the counter-support element which is formed projecting radially inwards in the aperture, or any undercut at this location.

The design of the expansion element renders it possible to insert the clamping sleeve quickly from the front end of the aperture, i.e. the end adjacent the clamping element, into the aperture. The expansion element functions in such a way that the expansion element is urged radially inwards via an insertion slope as soon as it passes the counter-support element. As soon as the abutment shoulder has passed the counter-support element, the expansion element snaps outwards by reason of the radially outwards directed expansion force and essentially latches against the counter-support element.

Then, by pushing the expansion element inwards, it is readily possible to remove the clamping sleeve, which can be done quickly e.g. by using a screwdriver. At the same time, the abutment shoulder provides secure and defined positioning of the clamping sleeve in the tool block. This benefits the reliability with which the tool is inserted into the clamping sleeve.

In an advantageous embodiment, a compression spring is formed which extends between a stop ring of the clamping sleeve at the front end of the aperture and the front end of the counter-support element. The compression spring urges the abutment shoulder of the expansion element against the counter-support element and in this respect permits axially a precisely defined position of the clamping sleeve.

The clamping sleeve can consist of any suitable material, including but not limited strong plastics or thermoplastics or fiber-reinforced plastic/thermoplastic materials, such as polypropylene, poly(vinyl chloride), polystyrene, acrylic, poly(ethylene terephthalate), poly(phenylene ether), poly (butylene terephthalate), nylon, polycarbonate, polyacetal, poly(phenylene sulfide), styrene, polyester, polyethylene, polyamide, polypropylene, e.g. polyphthalamide (PPA). One example of a commercially available material is Grivory GVX-7H available from EMS-GRIVORY, Sumter, S.C. Therefore, in accordance with the invention it is no longer necessary to use expensive materials such as beryllium-copper. Positioning precision is still at least equally high, as is wear resistance.

The clamping element can be formed from a plurality of radially inwardly acting clamping tongues, with which the tool can be clamped. For example, four clamping tongues can clamp the tool when distributed uniformly about the periphery of said tool.

The expansion element can also consist of several tongues, the expansion tongues. In this case, e.g. four expansion tongues can also be distributed annularly in a manner known per se, wherein suitable slots are formed between the expansion tongues in order to permit independent actuation.

The clamping element exerts, if the tool is held at this location, a clamping force radially inwards and, when the clamping sleeve is in the mounted state, the expansion element acts with its clamping force radially outwards.

In accordance with the invention, it is also possible, in the case of hitherto used clamping blocks, to replace the worn clamping sleeves consisting of beryllium-copper with clamping sleeves produced in accordance with the invention and consisting e.g. of PPA. However, it is also possible to produce a new machine tool in an identical manner with a correspondingly required number of inventive clamping sleeves in the tool block.

The stop ring, on which the compression spring is supported, serves at the same time to guide the clamping sleeve at the front end of the aperture. The clamping sleeve is guided in the aperture, i.e., in its rearward end, onto the counter-support element and, as stated, at its front end on the stop ring.

Incidentally, the extent to which the counter-support ring protrudes in the aperture of the tool block and the extent to which the stop ring protrudes radially outwards with respect to the clamping sleeve can be equal or can differ by e.g. 20%. The space between these rings is occupied preferably by the compression spring.

It is preferable that a machine tool is provided having a holder block having at least two apertures for receiving clamping sleeves, the clamping sleeves are each received in an aperture, each of the clamping sleeves has a clamping element with which a tool can be clamped, and each of the clamping sleeves at least partially passes through an aperture in the holder block and each clamping sleeve, has, at an end opposite the clamping element, an expansion element which engages behind the holder block or engages at a counter-support element of the holder block.

It is preferable that the tool comprises a shaft for clamping to the clamping element and the expansion element engages in a spring-loaded manner.

It is preferable that a compression spring extends between each of the clamping sleeves and the counter-support element of each of the apertures, which is configured to urge an abutment shoulder of the expansion element against the counter-support element of the holder block.

It is preferable that the expansion element is movable radially inwards and a non-tensioned state of the expansion element has a larger diameter than the aperture.

It is preferable that the expansion element of the clamping sleeve is configured to be compressed when being inserted into an aperture and/or into the counter-support element.

It is preferable that the expansion element has abutment shoulders on expansion tongues which extend radially outwards on the counter-support element or a rear end of an aperture.

It is preferable that each abutment shoulder extends radially or optionally obliquely at an angle between 70 and 90° to an axis of the clamping sleeve, more preferably at an angle between 80 and 88° and most preferably at an angle of at or about 85°.

It is preferable that the expansion element has insertion slopes, of which the diameter at a beginning of the insertion slope located at a rear end of the expansion element, is smaller than the diameter of an aperture and which diameter at the end of the insertion slope is larger than an inner diameter of the counter-support element.

It is preferable that the expansion element has slots which extend between the expansion tongues and that the expansion tongues are arranged distributed around the periphery of the expansion element.

It is preferable that there are at least 2 and up to 8 expansion tongues.

It is preferable that the clamping sleeve has a stop ring which has an outer diameter which, when abutting against the holder block and expanded expansion element, fixes a clamping sleeve of the at least two clamping sleeves in the holder block.

It is preferable that the clamping element is formed by radially inwardly acting clamping tongues, with which a tool can be clamped.

It is preferable that, formed on one side of the clamping element is a tangentially extending, radially inwardly pointing protrusion, by which pressure is exerted upon the shaft of the tool.

It is preferable that the holder block is fabricated of metal and the clamping sleeves are fabricated of thermoplastic material.

It is preferable that the thermoplastic material comprises fibre-reinforced PPA.

It is preferable that a machine tool is provided having a clamping device for a tool on the machine tool, a holder block having apertures for receiving clamping sleeves, each clamping sleeves received in an aperture, each clamping sleeve having a clamping element with which a tool or a shaft of the tool can be clamped, and each clamping sleeve passing through a counter-support element of the holder block or an aperture of the holder block and has, at an end opposite the clamping element, an expansion element which engages behind a counter-support element of the holder block.

It is preferable that a clamping sleeve is provided for insertion into a holder block for a tool of a machine tool which holder block has at least two apertures, the clamping sleeve having a clamping element at a first end with which a tool can be clamped, and an expansion element at a second end which engages behind the holder block or at a counter-support element of the holder block.

BRIEF DESCRIPTION OF THE DRAWINGS

Further details, advantages and features of the invention are apparent from the following description of several exemplified embodiments with reference to the drawings.

In the drawings.

DETAILED DESCRIPTION

Figure 1:
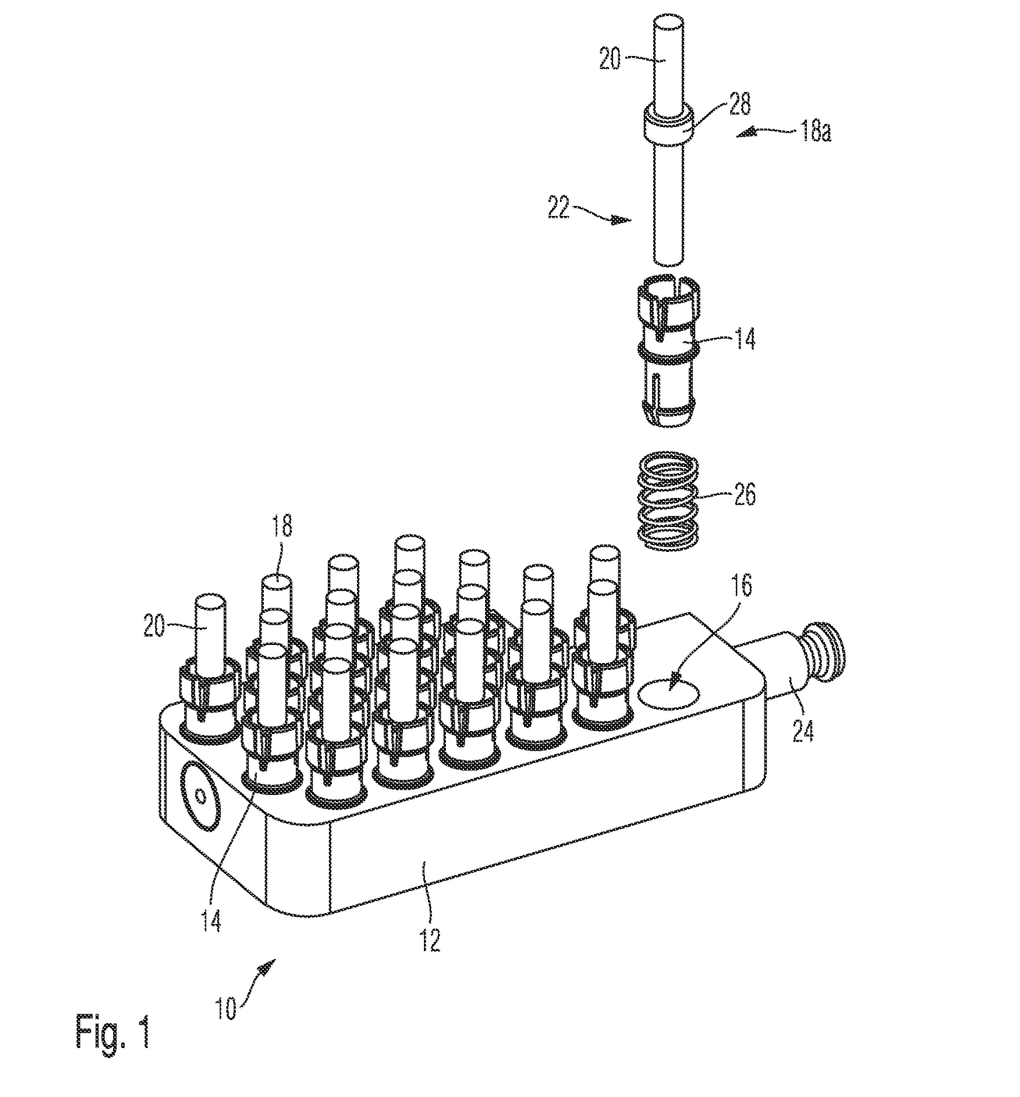
FIG. 1 shows a perspective view of a holder block in accordance with the invention, illustrating the clamping device in accordance with the invention and several tools.

FIG. 1 shows a clamping element 10, with which a holder block 12 is associated which receives a multiplicity of clamping sleeves 14 in a likewise provided multiplicity of apertures 16.

The clamping sleeves 14 shown in FIG. 1 are each fitted with tools 18.

As can be seen in FIG. 1, a multiplicity of clamping sleeves 14 are received in the holder block 12. An aperture 16 is provided for each clamping sleeve and the clamping sleeves 14 and the apertures 16 are similar to one another.

During operation, the clamping sleeves 14 can be fitted in any manner with tools 18. Of the tools 18 illustrated in FIG. 1 a respective shaft 20 can be seen, and of the separately illustrated tool 18a the working region 22 can also be seen. For the sake of simplicity, this is illustrated as a cylinder, wherein it is understood that in practice the working region 22 can be configured in the manner of a milling tool, a drill, a rotary grinding tool or in any other manner, and also in any shape and with any dimensions.

The machine tool has a tool arm which is provided with a chuck in a manner known per se. For the purpose of a tool change, the chuck can grip the shaft 20 of the desired tool 18 and withdraw it from the associated clamping sleeve 14.

If the tool 18 is no longer required, it can be introduced to the same location, i.e. into the then empty clamping sleeve 14, and the chuck can be released after the tool 18 has been put down at that location.

The holder block 12 is stored in a movable manner, together with the clamping sleeves 14 and tools 18 via a holding pin 24. Therefore, the tools 18 and the holder block 12 are subjected to corresponding accelerations, depending upon the movement of the holder block 12. Therefore, it is important that the tools 18 are mounted in a radially fixed manner in the clamping sleeves 14 which, in turn, are mounted in a fixed manner in the apertures 16.

For this purpose, a resilient bearing arrangement is provided which is shown only schematically in FIG. 1. However, a compression spring 26 can be seen in the exploded view illustrated on the right. It surrounds a specific region of the clamping sleeve 14 and permits axially resilient bearing of the clamping sleeve 14 in the holder block 12.

The tool 18 has a holding ring 28. On said holding ring, said tool is held in a clamped manner in the clamping sleeve 14. Moreover, the holding ring 28 separates the shaft 20 from the working region 22 of the tool 18.

Figure 2:
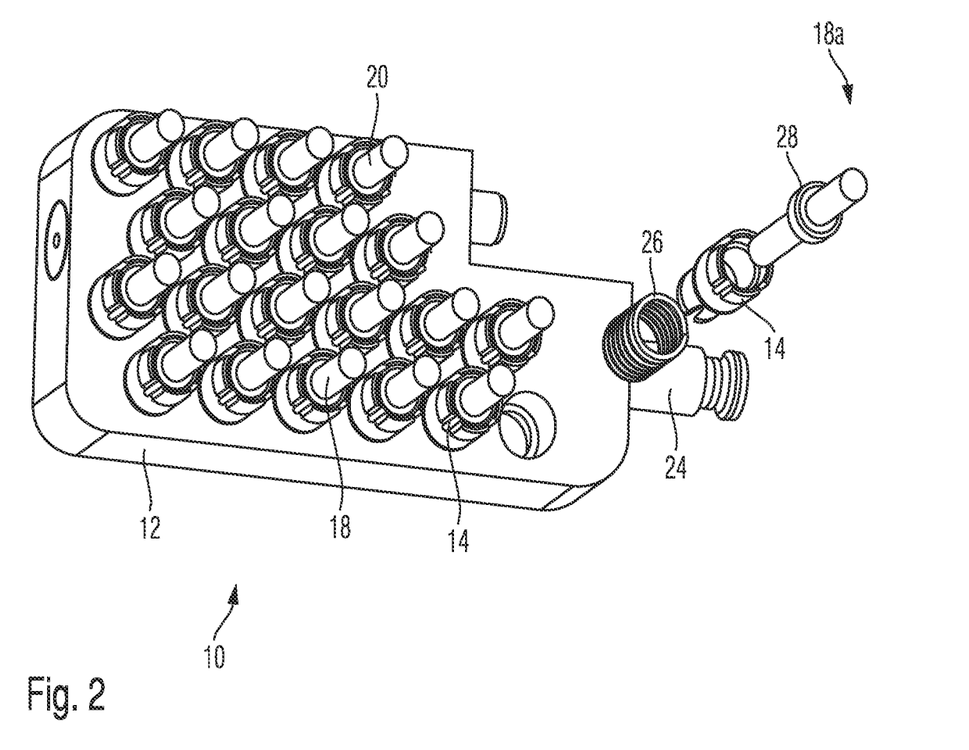
FIG. 2 shows a further view of the holder block, fitted with clamping sleeves and tools.
Figure 3:
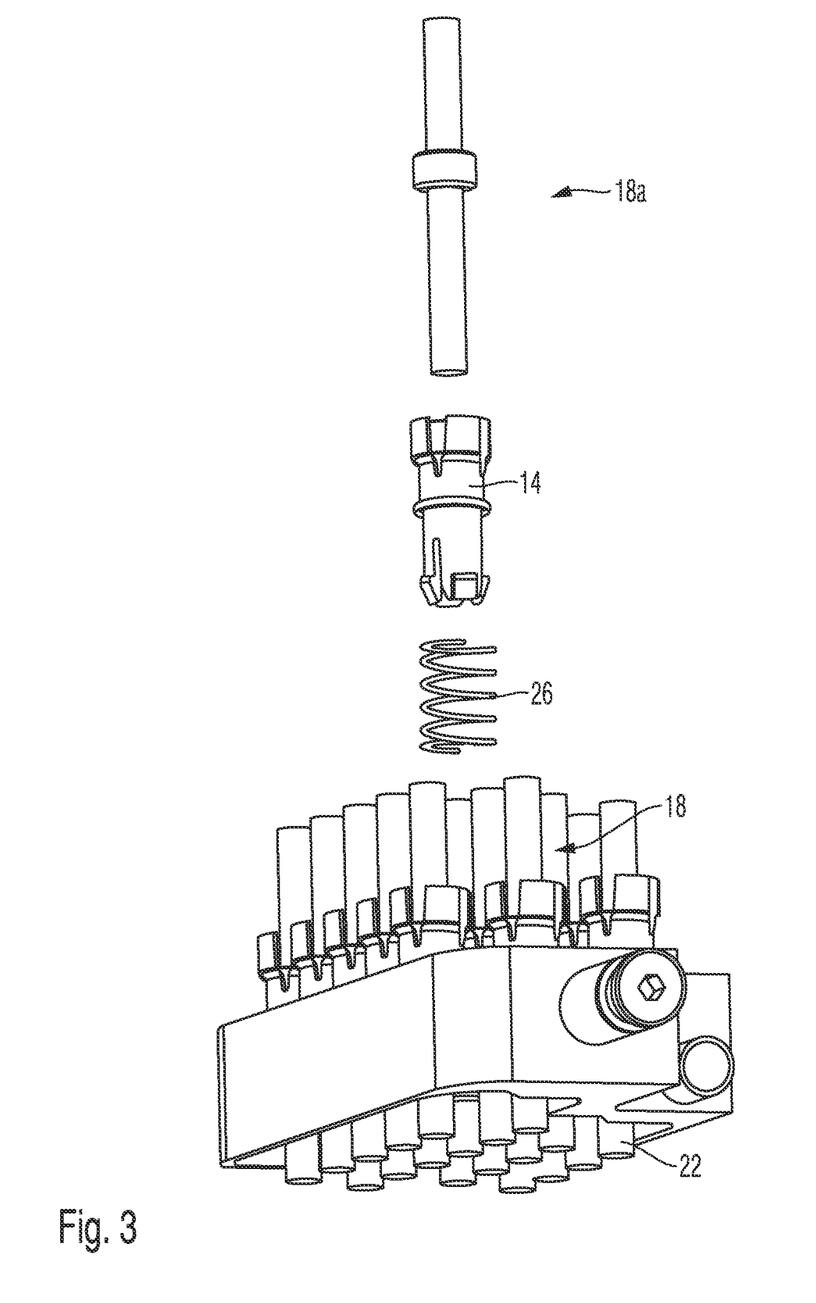
FIG. 3 shows a further view of the embodiment shown in FIGS. 1 and 2.
Figure 6:
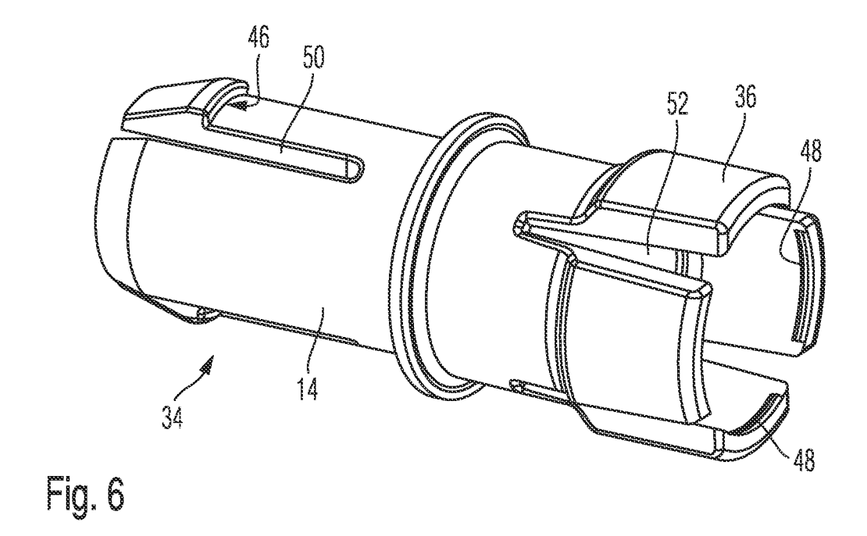
FIG. 6 shows another perspective view of one embodiment of the clamping sleeve.
Figure 7:
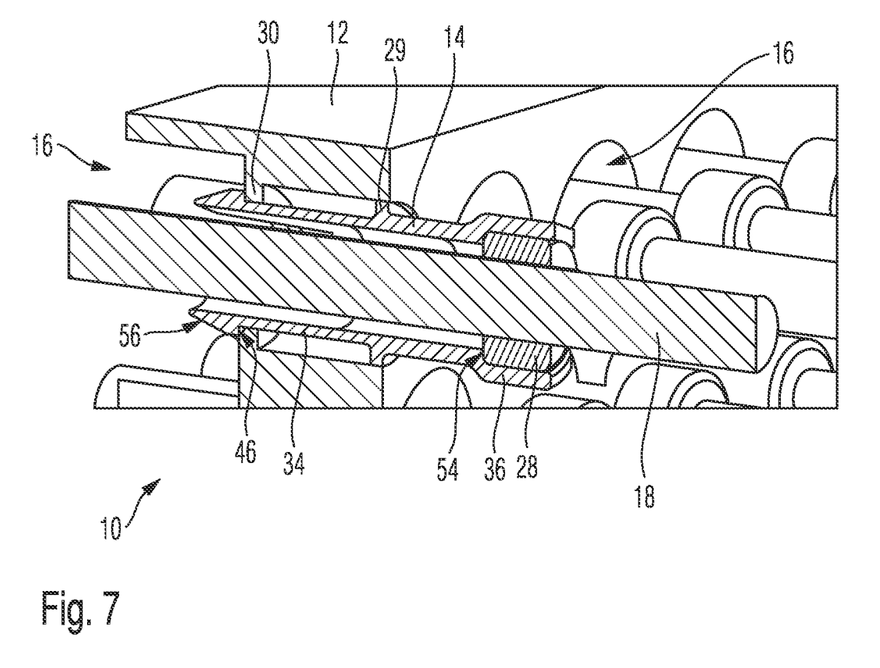
FIG. 7 shows a schematic sectional view of the clamping sleeve in the mounted state in the tool block.

FIGS. 2 and 3 show further perspective views of the holder block 12 with inserted clamping sleeves 14 and tools 18. The clamping sleeve 14 can be seen in a slightly larger view in FIG. 3. However, FIG. 4 and also FIGS. 5, 6 and 7 are even clearer in this respect. As in the other figures, like reference signs refer to like parts in this case.

The clamping sleeve 14 has a stop ring 29. It serves as a stop for the compression spring 26 on one of its sides and extends in the aperture 16. The compression spring 26 is supported on its other side on a counter-support element 30 illustrated in FIG. 7. It extends radially outside the clamping sleeve 14 at this location. At the rear end 30, the clamping sleeve 14 has an expansion element 34, and at the front end 32 has a clamping element 36.

Figure 4:
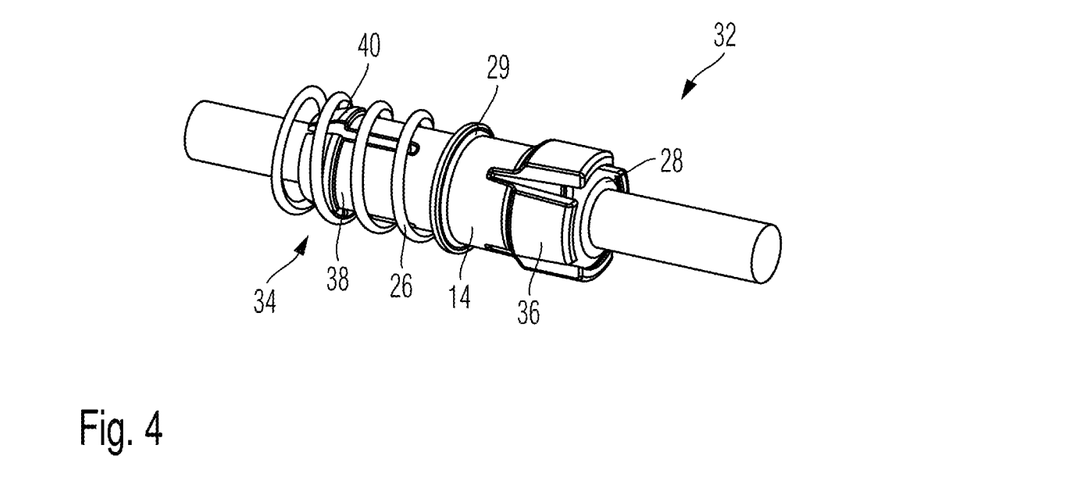
FIG. 4 shows a perspective view of a clamping sleeve, a compression spring and a schematically illustrated tool.
Figure 5:
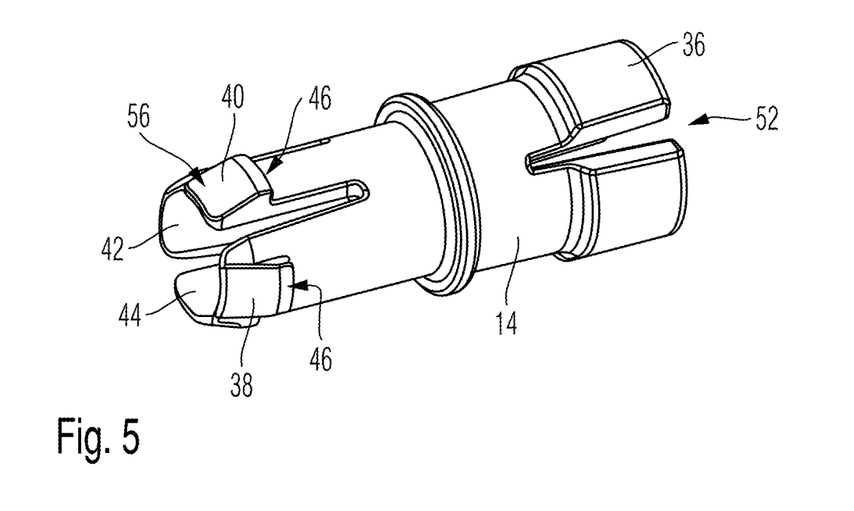
FIG. 5 shows a perspective view of one embodiment of a clamping sleeve.

In the illustrated exemplified embodiment, the expansion element 34 consists of four expansion tongues, of which the expansion tongues 38 and 40 can be seen in FIG. 4, and also the two further expansion tongues 42 and 44 can be seen in FIG. 5.

Each expansion tongue 38, 40, 42 and 44 or, as shown in FIG. 6, only 2 expansion tongues which lie opposite one another has an abutment shoulder 46. It is intended to lie against the counter-support element 30 of the aperture 16. For this purpose, the compression spring 26 is compressed by pushing the clamping sleeve 14 into the aperture 16 and in particular until the stop shoulder 46 snaps outwards on the counter-support element 30 and latches at that location. In this position, the clamping sleeve 14, as can be seen in FIG. 3, is held in an axially flexible manner in the aperture 16.

The axial elasticity is important when the tool 18 is being fitted because even if the tool arm with the tool 18 penetrates too deeply, this will not result in the destruction of the clamping sleeve 14. Therefore, in accordance with the invention it is possible to also use inexpensive PPA for the clamping sleeve 14.

The clamping element 36 is intended to hold the tool 18 on the holding ring 28. For this purpose, protrusions 48 which point radially inwards and hold the holding ring 28 by frictional engagement are provided on the end-side of the clamping element 36.

Incidentally, the diameter of the holding ring 28 is larger than that of the tool 18. Accordingly, the clamping element 36 is provided on the end-side internally with a slightly enlarged diameter, as can be seen in FIG. 6.

The expansion element 34 has, between the expansion tongues 38 to 44, slots 50 which can be seen in FIGS. 4 to 6.

Likewise, slots 52 are provided on the clamping element 36; all of the slots extend in an axially parallel manner with respect to the clamping sleeve 14, wherein preferably the slots 52 widen slightly towards the front end.

FIG. 7 shows the clamping element 10 in accordance with the invention in the mounted state. The compression spring 26 has been omitted from the illustration for the sake of clarity. The tool 18 extends with its working region 22 through the clamping sleeve 14 and in the illustrated exemplified embodiment even through the holder block 12 with the aperture 16. It is understood that the length of the working region 22 is different from tool to tool.

The clamping element 36 has a step 54 on the inside. It serves as an axial stop for the holding ring 28 in the clamping sleeve 14. The holding ring 28 has a radius on both sides; it can also be formed as a chamfer and serves to facilitate insertion of the holding ring 28 into the clamping element 36.

In a manner which is known per se, the expansion tongues 38 to 44 also have insertion slopes 56 which facilitate the insertion into the aperture 16 and in particular also into the region of the counter-holding element 30.

The invention claimed is:

1. A clamping device for a tool on a machine tool comprising
   a holder block (12), having at least two apertures for receiving clamping sleeves,
   wherein the clamping sleeves comprise at least two clamping sleeves each of which are received in an aperture of the at least two apertures,
   wherein each of the at least two clamping sleeves (14) has a clamping element (36) with which a tool (18) can be clamped, and
   wherein each of the at least two clamping sleeves (14) at least partially passes through an aperture of the at least two apertures (16) in the holder block (12) and each of the at least two clamping sleeves, has, at an end opposite the clamping element (36), an expansion element (34) which engages behind the holder block (12) or at a counter-support element (30) of the holder block (12),
   wherein a compression spring (26) extends between each of the at least two clamping sleeves (14) and the counter-support element (30) of an aperture of the at least two apertures (16) is configured to urge an abutment shoulder (46) of the expansion element (34) against the counter-support element (30) of the holder block (12).

2. The clamping device as claimed in claim 1,
   wherein the tool comprises a shaft (20) for clamping to the clamping element, and
   wherein the expansion element engages in a spring-loaded manner.

3. The clamping device as claimed in claim 2,
   wherein, formed on one side of the clamping element (36) is a tangentially extending, radially inwardly pointing protrusion (48), by which pressure is exerted upon the shaft of the tool (18).

4. The clamping device as claimed in claim 1,
   wherein the expansion element (34) is movable radially inwards and
   wherein a non-tensioned state of the expansion element (34) has a larger diameter than an aperture of the at least two apertures (16).

5. The clamping device as claimed in claim 1,
   wherein the expansion element (34) of the clamping sleeve (14) is configured to be compressed when being inserted into an aperture of the at least two apertures (16) and/or into the counter-support element (30).

6. The clamping device as claimed in claim 1,
   wherein the expansion element (34) has abutment shoulders (46) on expansion tongues (38 to 44) which extend radially outwards on the counter-support element (30) or a rear end of an aperture of the at least two apertures (16).

7. The clamping device as claimed in claim 6,
   wherein each abutment shoulder (46) extends radially or obliquely at an angle between 70 and 90° to an axis of the clamping sleeve (14).

8. The clamping device as claimed in claim 7,
   wherein the angle is between 80 and 88°.

9. The clamping device as claimed in claim 7,
   wherein the angle is 85°.

10. The clamping device as claimed in claim 1,
    wherein the expansion element (34) has insertion slopes (56), of which the diameter at a beginning of the insertion slope (56) located at a rear end of the expansion element (34), is smaller than the diameter of an aperture of the at least two apertures (16) and of which the diameter at the end of the insertion slope (56) is larger than an inner diameter of the counter-support element (30).

11. The clamping device as claimed in claim 1,
    wherein the expansion element (34) has slots (50) which extend between the expansion tongues (38 to 44), and
    wherein the expansion tongues (38 to 44) are arranged distributed around the periphery of the expansion element (34).

12. The clamping device as claimed in claim 1,
    the expansion tongues (38 to 44) comprise 2 to 8 expansion tongues.

13. The clamping device as claimed in claim 1,
wherein the clamping sleeve (14) has a stop ring (29) which has an outer diameter which, when abutting against the holder block (12) and expanded expansion element (34), fixes a clamping sleeve of the at least two clamping sleeves (14) in the holder block (12).

14. The clamping device as claimed in claim 1,
wherein the clamping element (36) is formed by radially inwardly acting clamping tongues (36), with which a tool (18) can be clamped.

15. The clamping device as claimed in claim 1,
wherein the holder block (12) is fabricated of metal and the at least two clamping sleeves (14) are fabricated of thermoplastic material.

16. The clamping device as claimed in claim 15,
wherein thermoplastic material comprises fibre-reinforced PPA.

17. A machine tool comprising
a clamping device for a tool on the machine tool,
a holder block having at least two apertures for receiving clamping sleeves,
wherein each of the clamping sleeves are received in an aperture of the at least two apertures,
wherein each clamping sleeve (14) has a clamping element (36), with which a tool (18) or a shaft (20) of the tool (18), can be clamped, and
wherein each clamping sleeve (14) passes through a counter-support element (30) of the holder block (12) or an aperture of the at least two apertures (16) in the holder block (12) and has, at an end opposite the clamping element (36), an expansion element (34) which engages behind a counter-support element (30) of the holder block (12),
wherein a compression spring (26) extends between each clamping sleeve (14) and the counter-support element (30) of the holder block (12), an aperture of the at least two apertures (16) is configured to urge an abutment shoulder (46) of the expansion element (34) against the counter-support element (30) of the holder block (12).

* * * * *